(12) United States Patent
Teeter

(10) Patent No.: US 6,713,008 B1
(45) Date of Patent: Mar. 30, 2004

(54) METHOD FOR MAKING COMPOSITE STRUCTURES

(76) Inventor: Darrin Blake Teeter, 3154 N. Wild Rose, Wichita, KS (US) 67205

(*) Notice: Subject to any disclaimer, the term of this patent is extended or adjusted under 35 U.S.C. 154(b) by 134 days.

(21) Appl. No.: 10/092,192

(22) Filed: Mar. 6, 2002

Related U.S. Application Data

(63) Continuation-in-part of application No. 09/888,262, filed on Jun. 22, 2001, now abandoned.
(60) Provisional application No. 60/213,842, filed on Jun. 23, 2000.

(51) Int. Cl.[7] .............................................. B29C 45/16
(52) U.S. Cl. ........................ 264/258; 264/240; 264/294; 264/313; 264/317
(58) Field of Search ............................... 264/317, 258, 264/240, 294, 313

(56) References Cited

U.S. PATENT DOCUMENTS

| | | | |
|---|---|---|---|
| 3,750,355 A | | 8/1973 | Blum |
| 4,495,237 A | * | 1/1985 | Patterson .................... 428/178 |
| 5,030,501 A | * | 7/1991 | Colvin et al. ............... 428/178 |
| 5,435,226 A | * | 7/1995 | McQuilkin .................. 89/36.02 |
| 5,609,942 A | * | 3/1997 | Ray ............................. 428/182 |
| 5,654,518 A | * | 8/1997 | Dobbs ........................ 89/36.02 |
| 5,866,235 A | * | 2/1999 | Fredrick et al. ............ 428/182 |
| 6,036,470 A | | 3/2000 | Basso, Jr. et al. |
| 6,050,523 A | | 4/2000 | Kraenzien |
| 6,051,089 A | | 4/2000 | Palmer et al. |
| 6,203,749 B1 | * | 3/2001 | Loving ....................... 264/510 |

* cited by examiner

Primary Examiner—Michael Colaianni
Assistant Examiner—Monica A Fontaine
(74) Attorney, Agent, or Firm—Robert Blinn

(57) ABSTRACT

The present invention is a method for making a composite structure that includes three resin impregnated structural cloth layers including a bottom sheet, a top sheet and a core sheet. The core sheet is a continuously curved shape with flat valleys that are bonded to the bottom sheet and flat peaks that are bonded to the top sheet. In the invention process, a dry core sheet is sandwiched between two wax core molds that form the core sheet. The core molds and the core sheet are sandwiched between dry top and bottom sheets by rigid molds as the flat peaks and valleys of the core sheet make contact with the top and bottom sheets through openings in the core molds. Liquid resin is transferred into the dry sheets and then cured. The lay up is disassembled and the wax core molds are melted and drained from the finished, rigid structure.

21 Claims, 6 Drawing Sheets

METHOD FOR MAKING COMPOSITE STRUCTURES

CROSS REFERENCE TO A RELATED APPLICATION

This application is a continuation-in-part of application Ser. No. 09/888,262 filed Jun. 22, 2000 now ABN Application Ser. No. 09/888,262 claimed the benefit of U.S. Provisional Patent application Ser. No. 60/213,842 filed Jun. 23, 2000.

FIELD OF THE INVENTION

This invention relates to a method for forming light weight, high strength composite structures having complex, enclosed, internal features.

BACKGROUND OF THE INVENTION

Enclosed structures made from thermo-setting resin impregnated structural fabric have long been produced by laying up external and internal plies of fabric within molds that include internal forms made from materials that melt at a temperature higher than the resin cure temperature but lower than the resin degradation temperature. U.S. Pat. No. 2,755,216 issued to Lemons teaches a process for forming a radome shell having internal, reinforcing walls. Lemons' shell is made out of fiberglass cloth impregnated with a thermosetting resin. In Lemons'process, resin impregnated sheets of fiber glass cloth are wrapped around elongated, rectangular wax mandrels. The wrapped mandrels are then laid up between resin impregnated sheets to complete a contoured structure. The resin in the Lemons lay-up is then cured at a temperature below the melting point of the wax mandrels. As the lay-up cures the resin that saturates adjacent sheets of material fuses and bonds while it hardens. Once the resin is cured, the entire lay-up is raised to a temperature that is above the melting point of the wax mandrels so that the wax mandrels can melt and drain out of the completed radome structure. The completed radome structure produced by the Lemons process has two shell walls that are reinforced and connected by a series of connecting walls that remain after the removal of the wax mandrels.

SUMMARY OF THE INVENTION

As noted above, the prior art includes processes that use destructible core molds for forming internal voids in composite structures. However, the prior art does not teach the use of extensive, one piece destructible core molds to produce large panel structures having internal reinforcing layers. The panel making process of the present invention is a method for making a three layered panel that has top, bottom and core sheets that are all made from resin impregnated structural fiber cloth. The top sheet is formed into a substantially flat or smoothly contoured shape. The bottom sheet is spaced from the top sheet. The core sheet joins and inter-supports the top sheet and the bottom sheet. It is formed into a three-dimensional shape having alternating elevations and depressions which vary about a neutral surface that is located between the top and bottom sheets. The depressions of the core sheet have flat valley areas that are bonded to the bottom sheet while the elevations of the core sheet have flat peak areas that are bonded to the top sheet. The core sheet is also a barrier between a lower cavity and an upper cavity. The lower cavity is open at the edges of the panel and is bounded by the bottom sheet and the core sheet. Similarly, the upper cavity is also open at the edges of the panel and is bounded by the top sheet and the core sheet.

The present invention method is most particularly concerned with the method for forming the core sheet and bonding it to the top sheet and the bottom sheet. The top, bottom and core sheets are all formed from fiber reinforced composite materials that include structural fiber fabric that is impregnated with thermosetting resin. This liquid thermosetting resin is cured to into a strong, rigid material when it is heated to a curing temperature. The method for making the panel of the present invention requires the use of an upper mold or a bag press for forming the top sheet, a lower mold for forming the bottom sheet, a first core mold and a second cold mold. The first and second core molds are opposite and symmetrical. They are substantially solid, having a flat surface on one side and a contoured surface with regularly alternating elevations and depressions on the other side. The elevations of each core mold include generally flat peak areas. The depressions of each core mold have openings that break through the flat surface of the core mold. The core molds fit together in an opposing fashion. The first core mold can also be understood as a solid that corresponds to the lower enclosed space between the bottom sheet and the core sheet of the finished panel. In the same way, the second mold can be understood as a solid that corresponds to the upper enclosed space between the core sheet and the top sheet of the panel. Because the volume between the core sheet and an adjacent top or bottom sheet of the panel is continuous and therefore not divided into more than one compartment, it is possible to use just two core molds to produce a panel having a large area. It is therefore not necessary to have a large number of separate core molds to lay up the sheets of the panel.

The core molds must be made from a material that is impermeable to the thermosetting resin that is used to impregnate the top, bottom and core sheets. The core molds must also be made from a material that has a melting point that is above the temperature at which the thermosetting resin cures and that is also below the temperature at which the cured resin begins to degrade. The presently preferred material for fashioning a core mold is a wax that melts at a temperature that is above the resin curing temperature and below the temperature at which the cured resin begins to degrade. Many of the resins known to those skilled in the art cure rapidly at temperatures below 160° F. and, once cured, will not degrade at temperatures that are twenty or thirty degrees above 160° F. Accordingly, good results can be obtained by making a core mold from wax that melts well above 160° F. Those skilled in the art routinely formulate waxes that will melt above selected temperatures. For example, a wax formulation consisting of 40 parts Calwax 126™ wax, 60 Parts Calwax 252B™ wax and 1 part Calwax 320™ wax will melt above 160° F. However, it should be noted that this formulation is only an example and that a myriad of waxes could be formulated having acceptable or even more desirable characteristics for the purpose of this invention.

The panel is laid up by first placing a first dry sheet of structural fiber cloth on the lower mold surface. This first dry sheet will become the bottom sheet of the finished panel. The first core mold is placed on top of the first dry sheet of structural fiber cloth so that its peaks are oriented away from the lower mold surface. A second sheet of dry structural cloth is place on top of the first core mold. This second dry sheet will become the core sheet of the finished panel. Then, a second core mold is placed on top of the second sheet in an opposite, fitting relationship with the first core mold.

Because the first core mold has openings at its valleys, the peak areas of the second core mold push the second sheet of cloth into contact with the first sheet at each of the valleys of the first core mold. A third sheet of structural cloth is then placed on top of the second core mold. This third sheet will become the top sheet of the finished panel. The second sheet is in contact with the third sheet where the valleys in the second core mold have openings and where the peak areas of the first core mold push the second sheet into contact with the third sheet. Either a bag press or a second mold is placed on top of the third sheet. Pre-impregnated sheets of structural cloth can be used for the top and bottom sheets and possibly even for the core sheet. However, a pre-impregnated sheet of cloth may not have the flexibility needed to conform to the bumpy contours of the core sheet.

It may also be necessary to pre-form a core sheet in a progressive molding or stamping process so that a core sheet conforms to the peaks and valleys of the core molds. Continuous fiber material does not easily assume a core shape having a deep draw over a large surface area. Accordingly, in a large lay-up having a relatively large core thickness it may be necessary to pre-form a core sheet using a progressive, stamping process or even a progressive, heated stamping process. A heated process is particularly useful when forming a continuous woven fiber core sheet that includes a binder such as a thermoplastic or a polyvinylalcohol. A core sheet fashioned from a mat of short, non-continuous fibers would be relatively easy to form into a core sheet in the above described steps.

After the lay-up is completed, liquid resin is transferred into the dry structural cloth through holes or channels in the upper or lower molds. The resin is such that it can be cured at a temperature below the melting point of the core mold material. After the resin is cured, the panel is removed from the lay-up and heated until the core mold material melts and drains out. As stated above, the temperature at which the core mold material melts is a temperature that does not harm the cured resin. A solvent may be used to wash out the remaining core mold material. The melted core mold material may be recovered and recycled for later use.

The resulting formed panel, if made using appropriate geometry and combinations of structural fiber cloth and resin systems, can be extremely strong and light. A panel structure made using the process of the present invention could even be produced in very large quantities in a continuous process resembling an extrusion process where elements are rolled together while being saturated with resin, cured and then drained of core mold material to produce a panel product.

In a second embodiment of the present invention, large hollow structures can be produced having enclosed internal structures. The method of the second embodiment includes the formulation of a core mold wax which melts above 160° F. and which contains between 10 and 60 parts ceramic micro-spheres. As noted above, a wax formulation that melts above 160° F., may consist of 40 parts Calwax 126™ wax, 60 Parts Calwax 252B™ wax and 1 part Calwax 320™ wax. The ceramic micro-spheres stabilize the thermal expansion characteristics of the destructible core mold wax composition so that large, precise structures can be molded with complex internal shapes. The panel described above as well as other larger structural elements can be molded using such a micro-sphere enhanced core mold composition.

The method of the present invention can be used to produce large, lightweight, high strength panels at a relatively low cost. Because the core molds can be made in single, large pieces, the time and labor involved in laying up a panel is greatly reduced. Structures made using the method of the present invention can be adapted for a wide range of applications. Only a few of the possible applications would include acoustic panels, structural panels and sound and impact energy absorbing panels.

DETAILED DESCRIPTION OF THE INVENTION

Figure 1:
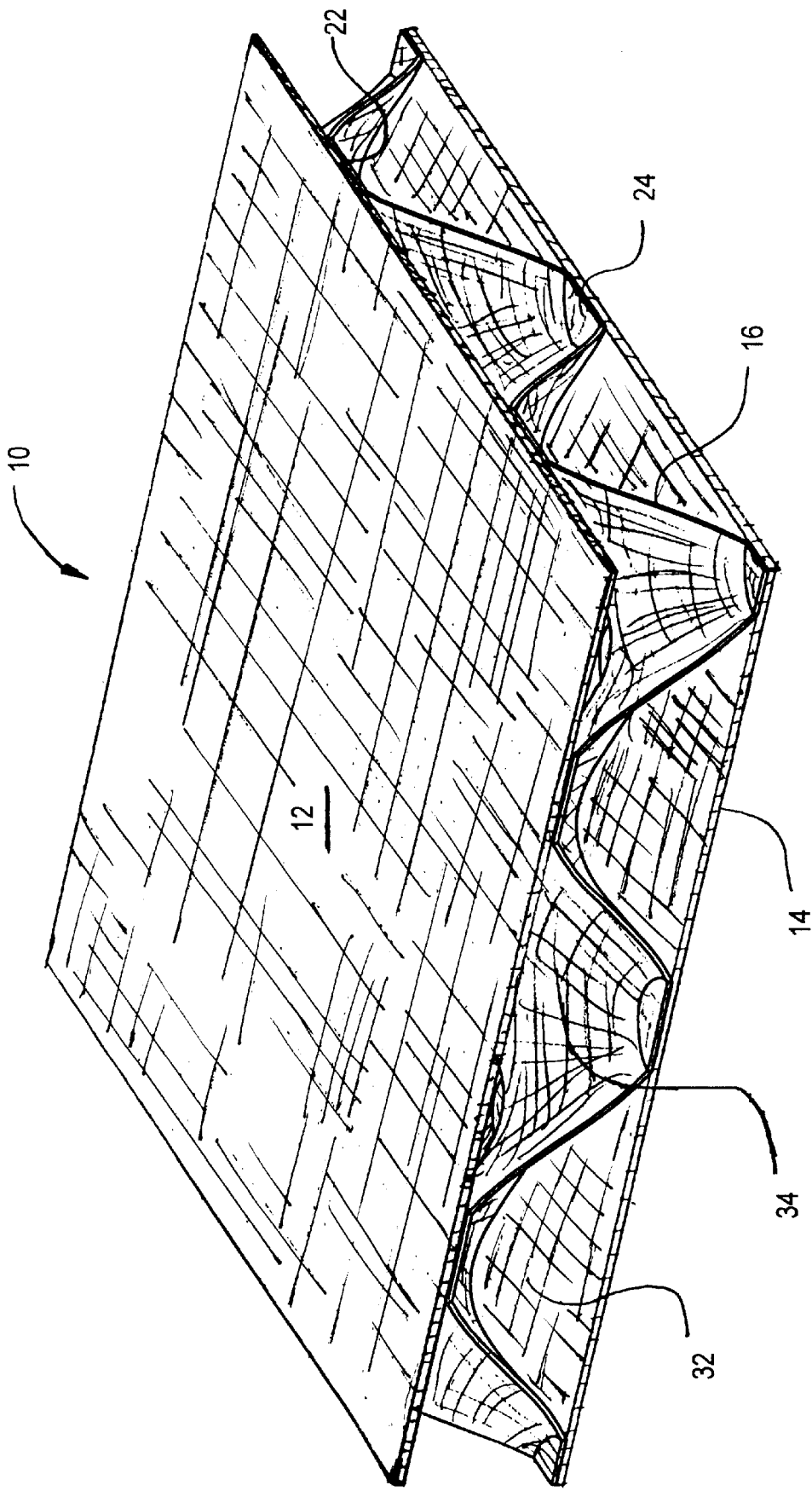
FIG. 1 is a perspective view of a panel made using the method of the present invention.
Figure 2:
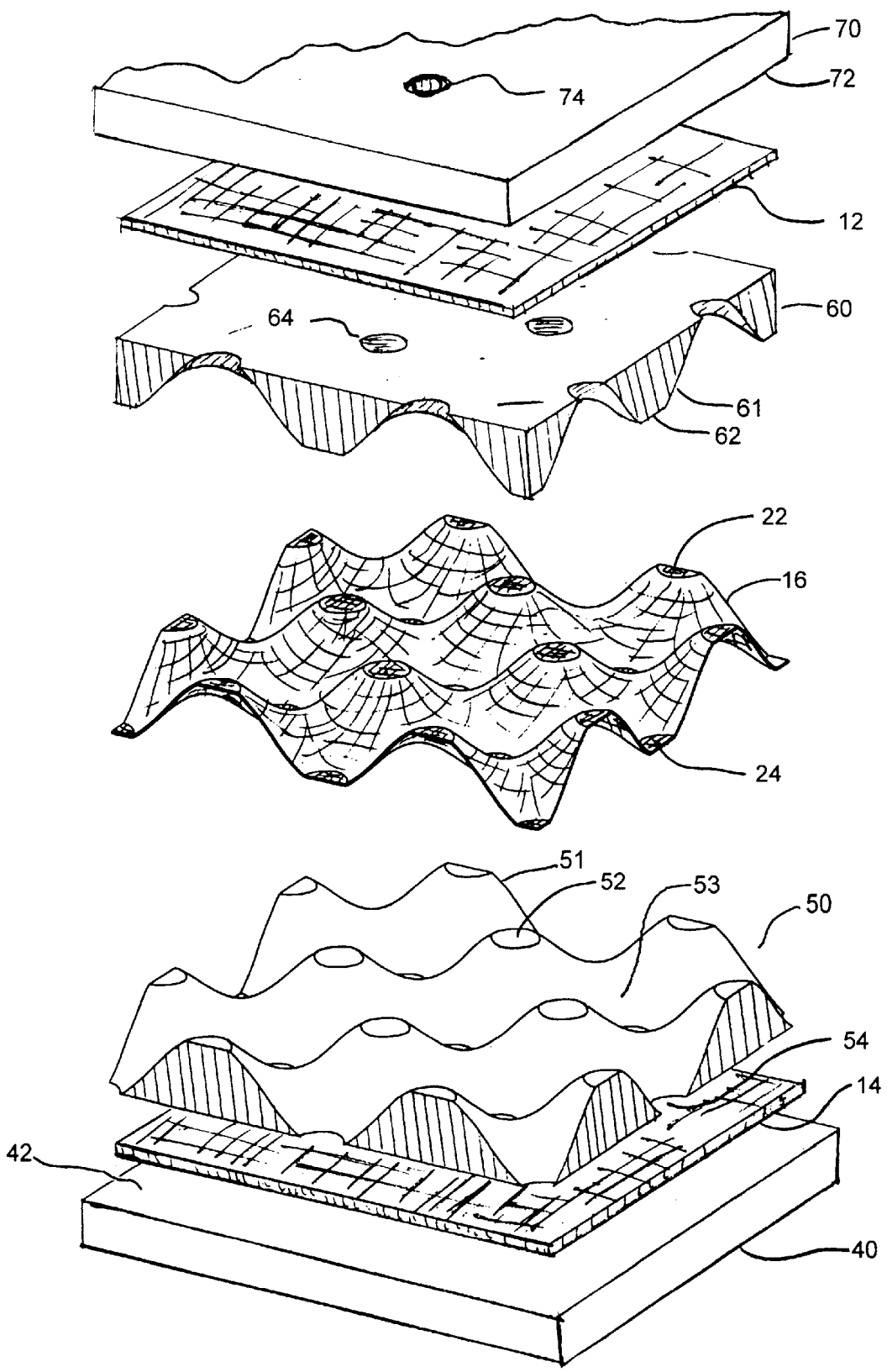
FIG. 2 is an exploded perspective view of a top sheet, a bottom sheet and a core sheet placed between mold surfaces.

FIG. 1 shows a panel 10 that is made using the method of the present invention. Panel 10 includes two face sheets—a top sheet 12 and a bottom sheet 14 and a core sheet 16. In FIG. 1, panel 10 is shown as a flat structure, however, panel 10 can also be formed into a contoured shape. Panel 10 is shown in FIG. 10 as having two face sheets, although the method of this invention can be employed to make a panel having a single face sheet. Although top sheet 12 and bottom sheet 14 are shown in FIG. 1 as substantially flat and parallel, they can be arranged and shaped in ways that are not planar or parallel. Core sheet 16 has a drastically undulating, three-dimensional, continuously curved shape that varies between elevations and depressions that have flat peaks areas 22 and flat valley areas 24. Preferably, core sheet 16 has a three-dimensional sinusoidal shape which has flat peak areas and flat valley areas as shown in FIG. 1 and FIG. 2. Between bottom sheet 14 and core sheet 16 is a continuous lower cavity 32. Similarly, between top sheet 12 and core sheet 16 is a corresponding, symmetrically opposite, continuos upper cavity 34. Top sheet 12, bottom sheet 14 and core sheet 16 are all fashioned from a structural fabric made from a material such as carbon fiber, fiber glass or an aramid fiber such as Du Pont Keviar® fiber. However, top sheet 12, bottom sheet 14 and core sheet 16 while sharing the same resin system, can be made from different fabrics as long as those fabrics are compatible with the resin. When resin is introduced into the structural fabrics of panel 10, core sheet 16 is bonded to bottom sheet 14 at each valley area 24. In the same way, core sheet 16 is bonded to top sheet 12 at each peak area 22. The strength of these bonds between top sheet 12, bottom sheet 14 and core sheet 16 can be increased or decreased by increasing or decreasing the surface area of valley areas 24 and peak areas 22. Either or both of lower cavity 32 and upper cavity 34 can be filled with rigid foam such as urethane foam.

The process of laying up panel 10 can be understood by referring to FIG. 2. FIG. 2 is a sectioned, perspective, exploded view of a lay-up for making a panel according to the method of this invention. To conduct the process for making panel 10, the following components are needed: (1) a lower mold 40 having a lower mold surface 42, (2) a bottom sheet 14, (3) a first core mold 50, (4) a core sheet 16, (5) a second core mold 60, (6) a top sheet 12 and an upper mold 70 having an upper mold surface 72. Bottom sheet 14, core sheet 16 and top sheet 12 are all made from a dry, unimpregnated structural fiber cloth. However, one or even all of these sheets can be replaced cloth that is pre-impregnated with resin. Because FIG. 2 is an exploded view of a lay-up, core sheet 16 is shown in a formed condition. Core sheet 16 would only assume this formed shape after being pressed between first core mold 50 and second core mold 60.

First core mold 50 and second core mold 60 can be made from the same material but do not have to be made from the same material. If, for example, dimensional stability is more important for top sheet 12 than for bottom sheet 14, a special composition having ceramic micro-spheres can be used for second core mold 60 having highly stable thermal expansion characteristics. Either first core mold 50 or second core mold 60 can be replaced by a polyurethane foam core that would remain with the finished part. The inventor has found that the best core mold material for both first core mold 50 and second core mold 60 is a wax composition that is formulated to melt at a temperature above 160° F. Those skilled in the art can easily formulate a wax having a desired melting point. A supplier of industrial waxes such as Calwax, Inc. of Irwindale, California can easily supply a wax composition having a desired melting point. For example, a wax composition consisting of 40 parts Calwax 126™ wax, 60 parts Calwax 252B™ wax and 1 part Calwax 320™ wax obtained from Calwax, Inc. will melt above 160° F. Ceramic micro-spheres or some other similar material can be added to the core mold composition to reduce thermal expansion effects at the curing temperature of the resin, to reinforce the core material structurally and to even reduce the weight of the core material. The addition of ceramic micro-spheres also makes it possible to compose core mold materials having such favorable thermal expansion characteristics that parts with larger internal volumes can be produced while maintaining the overall shape of the part within exact tolerances. Such space filling materials would also decrease the amount of heat needed to melt a volume of core mold wax. Core mold wax may also be foamed with a high pressure gas to greatly reduce its density. Foamed core molds would be particularly useful for fabricating a large panel structures where solid wax core molds would become heavy and difficult to manage. Foamed core molds because of their decreased mass would be easier to melt and remove from a panel lay-up.

As can be seen in FIG. 2, first core mold 50 has a number of depressions 53 that include valley openings 54 and elevations 51 that include flat peak surfaces 52. Second core mold 60 also has valley openings 64 and elevations 61 that include flat peak surfaces 62. When first and second core molds 50 and 60 are placed in an opposite, fitting relationship, the valley openings 54 of first core mold 50 align with the flat peak areas 62 of second core mold 60 and the valley openings 64 of second core mold 60 align with the flat peak areas 52 of first core mold 50. The curved surfaces of first core mold 50 and second core mold 60 correspond with each other and can be held in a spaced relationship so that the space between them defines a solid corresponding to the shape and contour of formed core sheet 16. First core mold 50 and second core mold 60 can be produced by molding an appropriate material into an appropriately machined die.

The process for making a panel includes a lay-up process, a resin impregnation step, a curing step and a core mold drain step. The process laying up a panel such as panel 10 shown in FIG. 1 includes the following steps: (1) placing bottom sheet 14 on lower mold surface 42 of lower mold 40, (2) placing first core mold 50 on top of bottom sheet 14 so that elevations 51 of first core mold 50 are oriented in an upward direction, (3) placing core sheet 16 on top of first core mold 50, (4) placing second core mold 60 on top of the second sheet of cloth in an opposite, fitting relationship with first core mold 50 so that elevations 61 of second core mold 60 align with depressions 53 of first core mold 50, (5) placing top sheet on top of the second core mold 60 so that it is in contact with core sheet 16 at valley openings 64 of second core mold 60, (6) placing an upper mold 70 on top of top sheet 12 and then pressing the lay-up together with enough force to bring all of the components into fitting contact. Upper mold 70 may be replaced in this process with a vacuum bag or some other means for applying pressure over a large area.

The impregnation process is accomplished by introducing low viscosity resin through a port such as resin entry port 74 shown in upper mold 70 in FIG. 2. Lower mold 40 can also have at least one resin entry port. If upper mold 70 is replaced by a vacuum bag, then lower mold 40 must have at least one resin entry port. Once the thermosetting resin has completely saturated top sheet 12, core sheet 16 and bottom sheet 14, the lay-up is heated and maintained at a resin curing temperature. In the case of an epoxy resin used in combination with carbon fiber cloth, a typical curing temperature would be about 160° F. An isothermal transfer process may be conducted where heated resin is transferred into a heated lay-up at the resin curing temperature. However, an isothermal transfer process must be conducted rapidly so that resin flows into the layers of the lay-up before it begins to harden.

After the resin is cured, upper mold 70 and lower mold 40 are separated from the panel. At this point, the core mold material can be melted and drained from the panel. This is accomplished by heating the panel to a temperature which is above the melting point of the core mold material but below the point at which the cured resin of the panel layers will degrade. The preferred wax composition described above can be melted efficiently at 180° F. which is well below the temperature at which many epoxy resins will degrade. The melted core mold material can be recovered for future use. Because first core mold 50 and second core mold 60 have no isolated pockets, the core mold material can be completely drained and removed. Core mold material residue can also be washed out with a solvent that will dissolve the core mold material but that will not attack the resin or carbon fiber material of the composite. What remains is a panel structure such as panel 10 shown in FIG. 1. Although FIG. 2 illustrates the lay-up for a flat panel having parallel top and bottom sheet, contoured panels and panels having nonparallel top and bottom sheets could be produced using the process.

Figure 3:
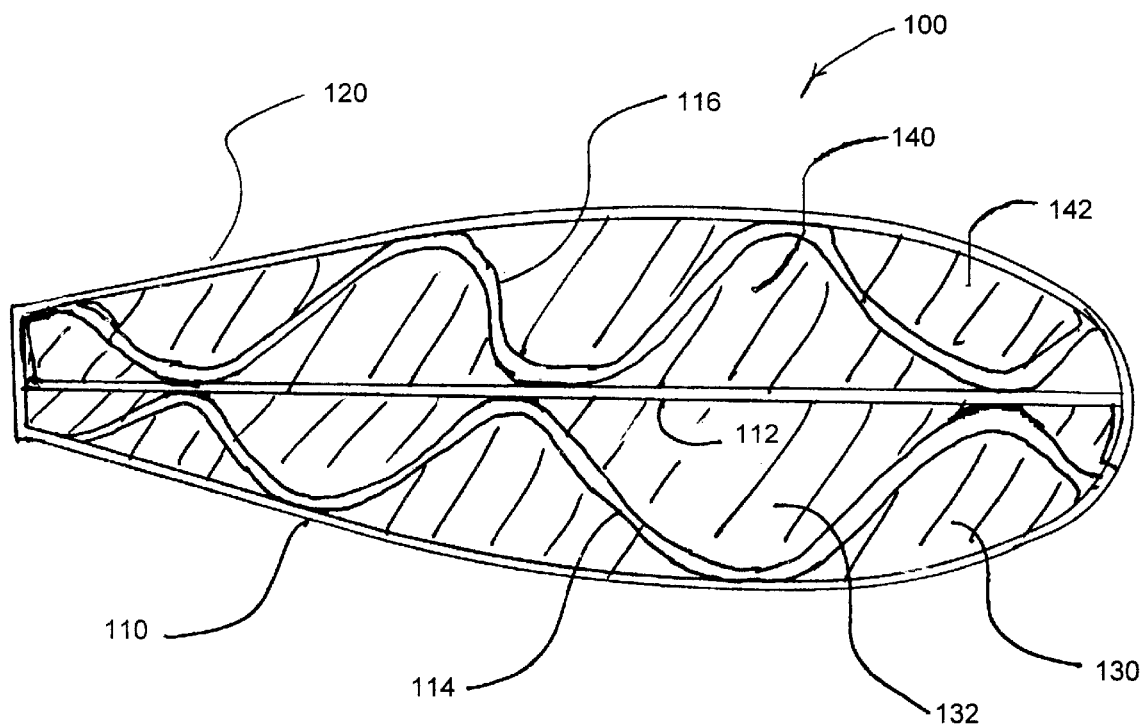
FIG. 3 is a side view of a structure made according to a second method of the present invention.

FIG. 3 illustrates a second embodiment of the present invention. By using a wax core material as described above with an additive of ceramic micro-spheres, it is possible to obtain a core mold having better compressive strength and more stable thermal expansion properties. With such a core mold composition, it is possible to build a structure 100 as shown in FIG. 3 having carefully controlled outer contours. Structure 100 includes a lower sheet 110, a center sheet 112, a first core sheet 114, a second core sheet 116 and an upper sheet 120. First core sheet 114 can have a three dimensionally curved shape much like core sheet 16 shown in FIG. 2.

Similarly, second core sheet 116 can have a three dimensionally curved shape much like core sheet 16 shown in FIG. 2. Because a core mold wax used to make the core mold elements that define the various spaces between the layers of the lay-up shown in FIG. 3 is stabilized with ceramic micro-spheres, the outside contours of lower sheet 110 and upper sheet 120 can be formed with a high degree of accuracy even if the structure is relatively large.

Any of the above described structures can be made using a number of types of structural fiber cloths, including woven cloths having directional fibers and non-woven mats. Non-woven mat materials may be particularly well suited for laying up drastically contoured core sheets. A panel made according to this method can be made from a variety of materials including carbon fiber, fiberglass and arimid fibers such as Du Pont Kevlar® fiber. Various thermosetting resins can be used including phenolic, vinyl ester, polyester and epoxy resins. Moreover, flexible resin systems can be used so that inflatable structures can be produced using the method of the present invention. Such a flexible structure could be inflated with high pressure gas into a rigid form and yet could also be deflated and compacted into a very small volume for storage.

Figure 4:
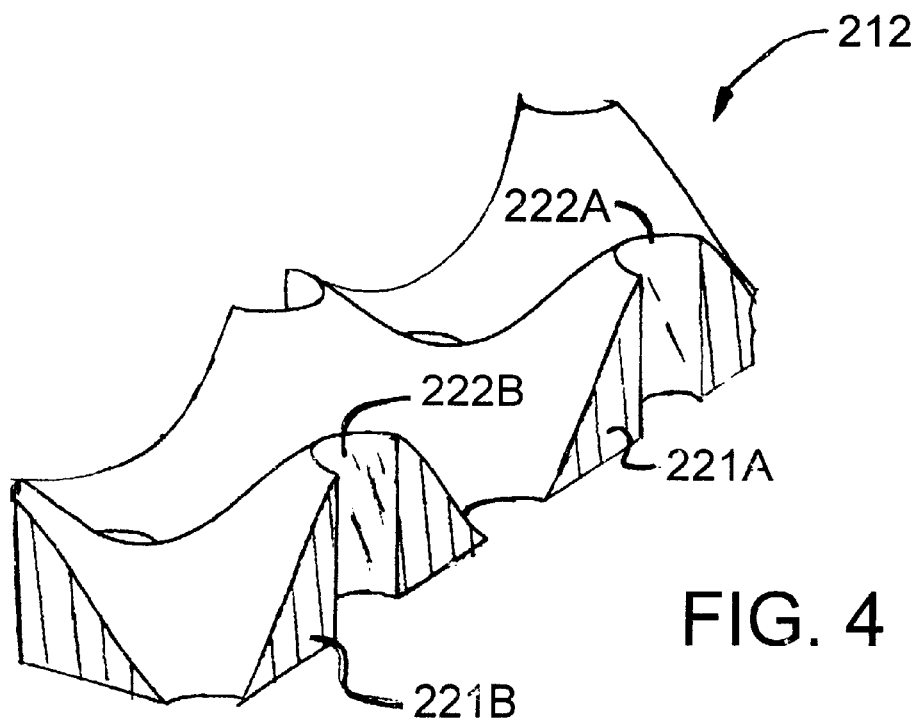
FIG. 4 is a cross sectional, perspective view of a core mold having channels for molding internal support columns.
Figure 5:
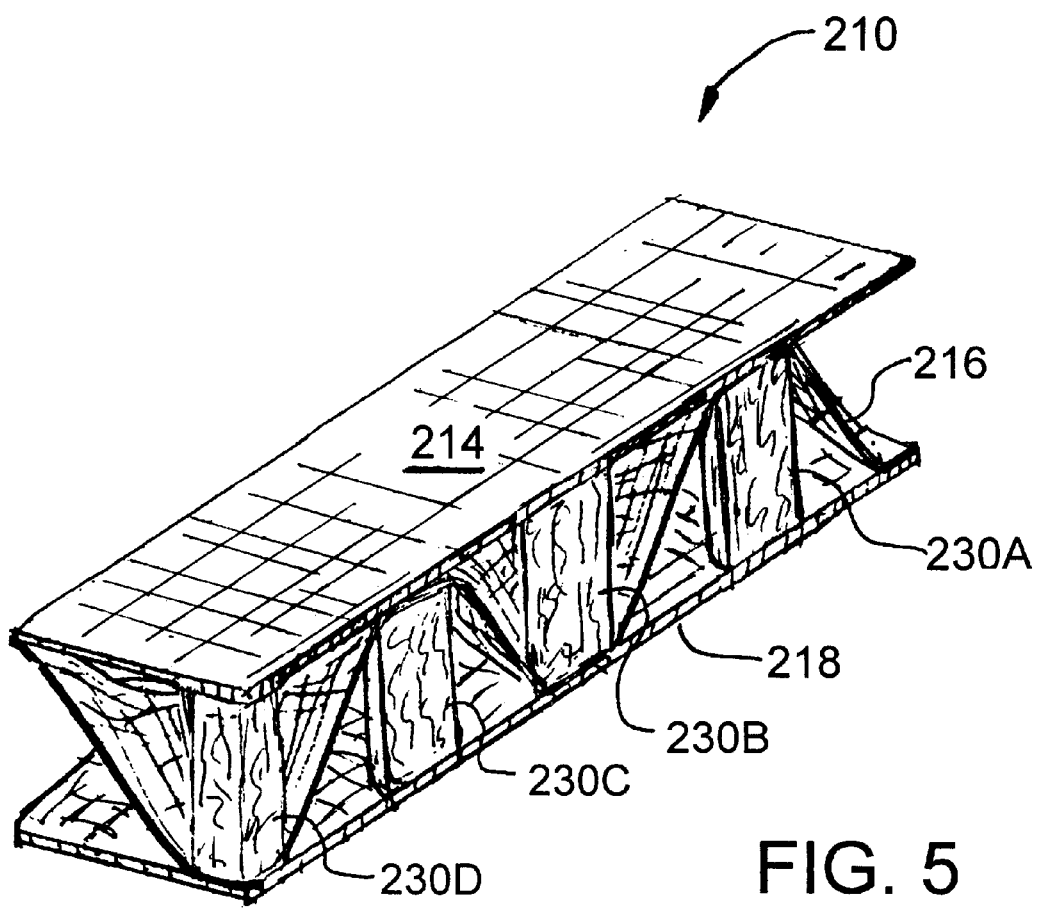
FIG. 5 is a cross sectional, perspective view of a panel having internal support columns made using core molds such as the core mold shown in FIG. 4.

FIG. 4 and FIG. 5 illustrate a second type of panel made using a second embodiment of the present invention method. FIG. 4 shows a cross section of a core mold 212 which includes two sectioned elevated portions 221A and 221B. Unlike core molds shown in the above figures, core mold 212 has vertical channels 222A and 222B that extend from its lower surface to the tops of its elevated portions at their peak areas. The vertical channels do not have to be cylindrical as shown in FIG. 4, as their shapes may be modified to best fit the structural requirements of the application.

Panel 210 shown in FIG. 5 is produced if core mold 212 and its corresponding opposite (not shown) are laid up with a top sheet 214, a core sheet 216 and a bottom sheet 218. Because the core molds used to make panel 210 included vertical channels such as vertical channels 222A and 222B shown in FIG. 4, columns 230A, 230B, 230C and 230D composed of hardened resin remain after the core molds have been melted and drained. The addition of columns 230A, 230B, 230C and 230D greatly increase the compression strength of panel 210.

The method for making panel 210 would be essentially the same method described above. However, intermediate steps of introducing reinforcing aggregate or fibrous filler materials such as micro-spheres or reinforcing fibers into the vertical channels of the core molds could be added after the first core mold is placed on top of bottom sheet 218 and again after the second core mold is placed on top of core sheet 216. Alternatively, the reinforcing materials could be pre-placed into the vertical channels of the core molds and held in place through the use of an adhesive binders. The addition of micro-spheres, other space filling materials, reinforcing aggregate materials, fibrous filler materials or structural fibers to the vertical channels of the core molds would change the properties of the mostly resin columns that are formed in those channels. Another method of modifying the properties of the columns would involve the pre-placement of small reinforcing rods or other shapes fashioned from a solid material such as plastic, composite material, graphite or plastic foam, wood and the like. Such solid reinforcing elements could be molded into the core mold, or alternately placed by press fitting or adhesive bonding.

Figure 6:
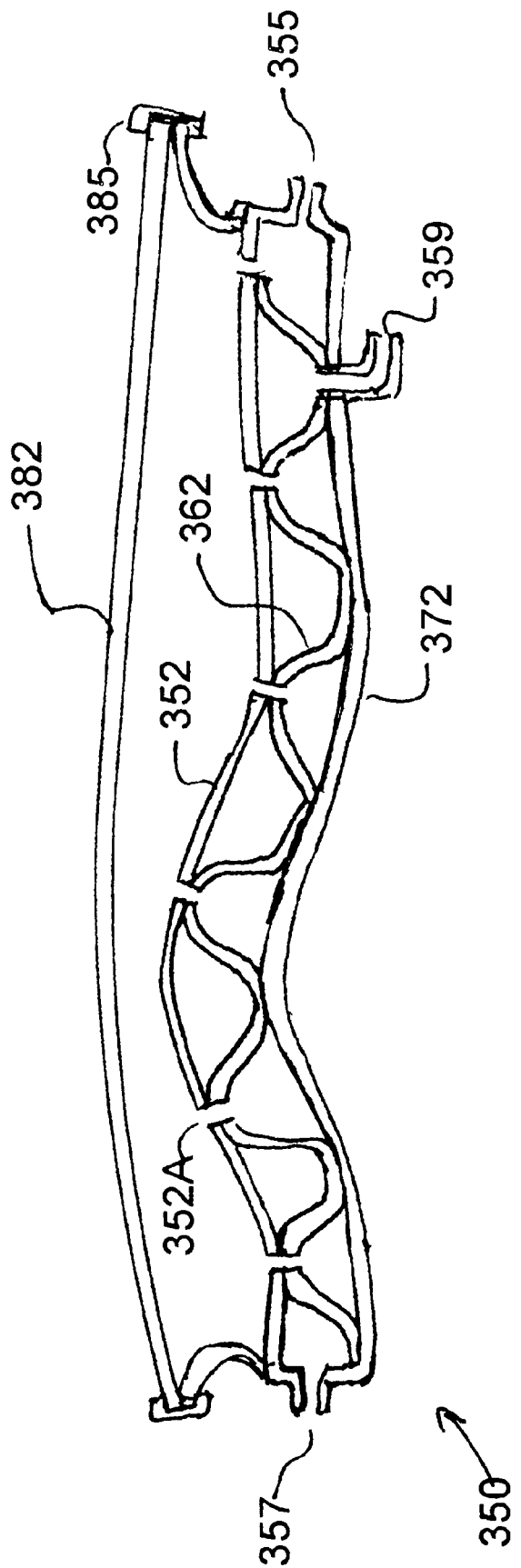
FIG. 6 is a sectional view of a forming die made using the method of the present invention.

FIG. 6 illustrates a panel produced using the method of this invention which has been adapted for use as a die for thermo-forming a thermoplastic sheet of material. FIG. 6 is a sectional view of a panel that has been formed into a die for shaping a work-piece that is a sheet of polymer or thermo-plastic material. In this case, the panel is formed into a contoured die 350 having sealed edges so that it can apply a vacuum to a work-piece 382 through holes in the top surface that connect to the lower cavity of die 350. The vacuum pulls work-piece 382 that has been heated to its softening point into close contact with the surface of die 350. The cavity of die 350 that is closest to work-piece 382 can also supplied with a cooling fluid to remove heat from work-piece 382 to cause it to cool and conform to the surface of die 350.

As can be seen in FIG. 6, die 350 includes a top sheet 352, a core sheet 362 and a bottom sheet 372. Top sheet 352 is contoured to a desired shape for forming work piece 382. A pattern of openings 352A establishes pneumatic communication between the volume between work-piece 382 and top sheet 352 and the lower cavity between core sheet 362 and bottom sheet 372. A continuous seal 385 maintains an air tight seal between work-piece 382 and die 350. A vacuum source can be connected to vacuum port 355 to establish a vacuum in the cavity between core sheet 362 and bottom sheet 372 and in the volume between work-piece 382 and die 350. Because of the ambient air pressure surrounding work-piece 382, even a slight, partial vacuum in the space between work-piece 382 and die 350 will cause work-piece 382 to draw down tightly upon top sheet 352 of die 350.

A cooling fluid can enter an inlet port 357, circulate through the cavity between top sheet 352 and core sheet 362 and then exit an outlet port 359. In the example illustrated in FIG. 6, work-piece 382 is a heated thermoplastic sheet and the fluid circulating within mandrel 350 is a cooling fluid that removes heat from work-piece 382 after it has been drawn down upon the surface of top sheet 352. Heated work-piece 382 will become rigid as it cools so that its final form will conform to the shape of die 350.

Figure 7:
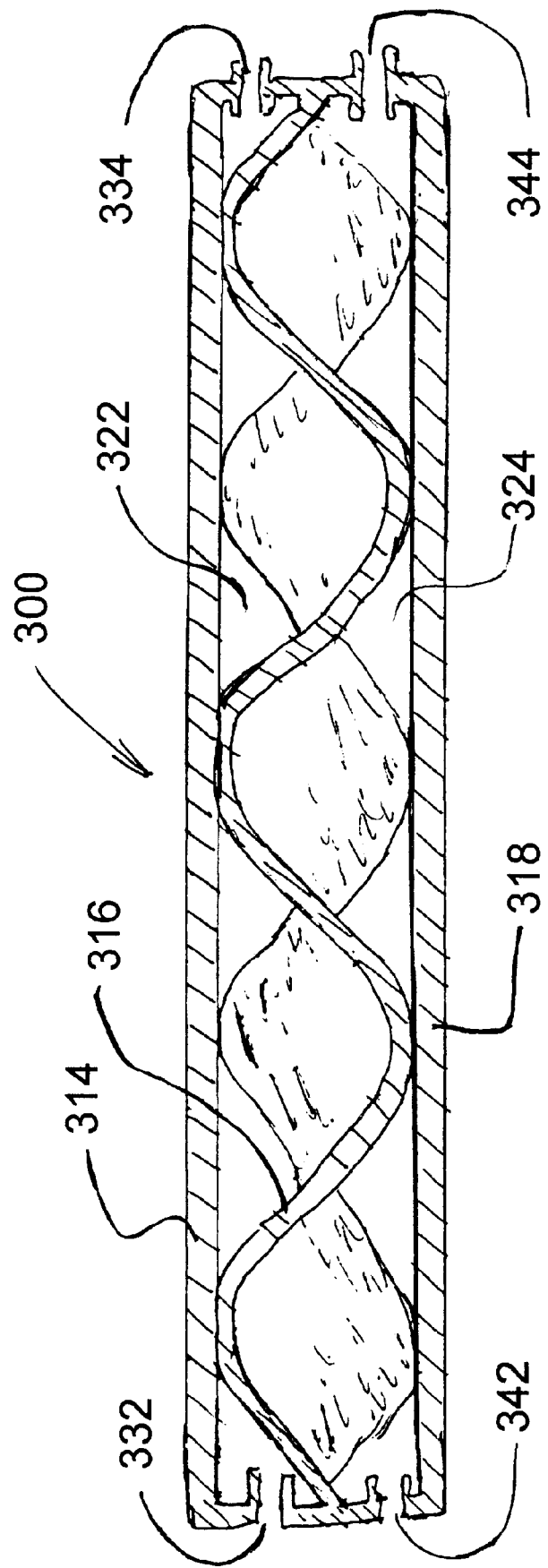
FIG. 7 is a sectional view of a heat exchanger made using the method of the present invention.

FIG. 7 illustrates another panel made using the process of the present invention which is adapted for use as a heat exchanger. Panel 300 shown in FIG. 7 includes a top sheet 314, a core sheet 316 and a bottom sheet 318. Top sheet 314, core sheet 316 and the sealed edges of the panel define an upper cavity 322, while bottom sheet 318, core sheet 316 and the sealed edges of the panel define a lower cavity 324. First and second ports 332 and 334 provide a way for a first fluid to enter and exit upper cavity 322. Third and fourth ports 342 and 344 provide passageways for a second fluid to enter and exit lower cavity 324. If core sheet 316 is fashioned from a composite material having an acceptable degree of thermal conductivity, then heat can be exchanged between the first and second fluids as they circulate within upper cavity 322 and lower cavity 324.

Obviously, in view of the embodiments described above, numerous modifications and variations of the preferred embodiments disclosed herein are possible and will occur to those skilled in the art in view of this description. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly to be understood that these modifications and variations, and the equivalents thereof, are to be considered within the spirit and scope of the invention as defined by the following claims, wherein,

I claim:

1. A method for making a structure that includes at least two resin impregnated structural fibrous cloth layers including at least one face sheet and a core sheet having a continuously curved, three-dimensional shape with peak areas that are bonded to the at least one face sheet, the method comprising the following steps;

(a) sandwiching a dry core sheet of structural fibrous cloth between two core molds that fit together in an opposing manner so as to form the core sheet into a three-dimensional shape having alternating elevations and depressions that include peak areas and valley areas, the core molds having peak areas and open valley areas for exposing the valley areas and the peak areas of the core sheet, the core molds fashioned from a material that melts at a core mold melting temperature, (b) sandwiching the core molds and the core sheet with at least one face sheet of structural fibrous cloth so that the peak areas of the core sheet contact the at least one face sheet, (c) forming the resulting lay-up with at least one mold so as to press the layers of the lay-up together and shape the resulting lay-up to conform to a desired shape, (d) transferring liquid resin into the core sheet and the at least one face sheet, the liquid resin having a curing temperature that is below the core mold melting temperature and a cured degradation temperature that is higher than the core mold melting temperature, (e) curing the liquid resin that is in the layers of the structure resulting from step (d) at a temperature that is below the core mold melting temperature, (f) melting and draining the core mold material out from between the cured layers of the structure resulting from step (e) at a temperature that is between the core mold melting temperature and the cured resin degradation temperature.

2. The method of claim one, wherein;

the core mold material contains a filling material that changes the physical properties of the core mold material.

3. The method of claim one, wherein;

the core mold material contains at least five parts per hundred of ceramic micro-spheres, whereby the micro-spheres reduce the degree by which the core mold material expands as the temperature of the material is increased and decreased.

4. The method of claim one, wherein;

the core mold material is foamed so that it includes air pockets within its volume to reduce its density.

5. The method of claim one, wherein;

at least one of the core molds is a foam material that is not melted and removed.

6. The method of claim one, wherein;

the lay up of core molds and the core sheet are sandwiched between a dry top sheet and a dry bottom sheet so that the valley areas of the core sheet can come in contact with the bottom sheet and so that the peak areas of the core sheet can come in contact with the top sheet, and wherein, at least one of the core molds include channels that extend between its opposite surfaces at least at some of the peak areas of the core mold so that when resin is transferred into the sheets of the panel, the channels fill with resin thereby forming hardened resin columns that connect and inter-support the top sheet and the bottom sheet of the panel when the resin in the panel is cured.

7. The method of claim one, wherein;

the lay up of core molds and the core sheet are sandwiched between a dry top sheet and a dry bottom sheet so that the valley areas of the core sheet can come in contact with the bottom sheet and so that the peak areas of the core sheet can come in contact with the top sheet, and wherein, at least one of the core molds include channels that extend between its opposite surfaces at least at some of the peak areas of the core mold and wherein micro-spheres are introduced into those channels prior to a point when resin is transferred into the sheets of the panel, so that when resin is transferred into the sheets of the panel, the channels filling with resin thereby forming hardened resin columns containing micro-spheres that connect and inter-support the top sheet and the bottom sheet of the panel when the resin in the panel is cured.

8. The method of claim one, wherein;

the lay up of core molds and the core sheet are sandwiched between a dry top sheet and a dry bottom sheet so that the valley areas of the core sheet can come in contact with the bottom sheet and so that the peak areas of the core sheet can come in contact with the top sheet, and wherein, at least one of the core molds include channels that extend between its opposite surfaces at least at some of the peak areas of the core mold and wherein reinforcing material is introduced into those channels prior to a point when resin is transferred into the sheets of the panel, so that when resin is transferred into the sheets of the panel, the channels filling with resin thereby forming hardened fiber reinforced resin columns that connect and inter-support the top sheet and the bottom sheet of the panel when the resin in the panel is cured.

9. The method of claim one, wherein;

the resin is a resin that is flexible in its cured condition.

10. The method of claim one, wherein;

at least one of the sheets of structural cloth is a fibrous cloth material that is pre-impregnated with resin so that it is not necessary to transfer resin into the cloth with a resin transfer process.

11. A method for making a composite panel from sheet of structural fiber cloth impregnated with hardened resin, the panel including a top sheet that conforms to a top surface, a bottom sheet that conforms to a bottom surface and a core sheet inter-connecting the top sheet and the bottom sheet, the core sheet having alternating elevations and depressions that vary in a continuously curving, three dimensional manner about a neutral geometric surface that is located between the top surface and the bottom surface, the elevations of the core sheet including substantially flat peak areas that match the top surface and that are bonded to the top sheet, the depressions of the core sheet including substantially flat valley areas that match the bottom surface and that are bonded to the bottom sheet, the method for making the composite panel comprising the following steps;

(a) obtaining a lower mold having a mold surface that conforms in shape to the shape to the bottom surface of the panel, (b) placing a bottom sheet of dry structural fiber cloth on top of the lower mold, (c) placing a first core mold on top of the bottom sheet, the first core mold fashioned from a material that melts at a melting temperature, the first core mold having a lower surface that matches the mold surface of the lower mold, the upper surface of the first core mold having alternating elevations and depressions that vary in a continuously curving, three dimensional manner corresponding to the desired shape of the core sheet, the first core mold also having openings located to correspond with the substantially flat valley areas of the core sheet, (d) placing a second sheet of dry structural fiber cloth on top of the first core mold, (e) placing a second core mold on top of the second sheet, the second core mold fashioned from a material that melts at a melting temperature, the second core mold having an upper surface that matches the upper mold, the lower surface of the second core mold having alternating elevations and depressions that vary in a continuously curving, three dimensional manner corresponding to the desired shape of the core sheet in an opposite fitting relationship with the shape of the upper surface of the first core mold, the second core mold having openings located to correspond with the substantially flat peak areas of the core sheet, (f) placing a top sheet of dry structural fiber cloth on top of the second core mold, (g) placing an upper mold on top of the top sheet having a lower surface that conforms in shape to the shape of the surface of the top sheet, (h) pressing the bottom sheet, the first core mold, the core sheet, the second core mold, the top sheet and the upper mold together so that the bottom sheet is in contact with the core sheet at the locations of the valley areas of the core sheet and the top sheet is in contact with the core sheet at the locations of the peak areas of the core sheet, (i) introducing a liquid thermosetting resin that cures at a temperature below the core melting temperature into the bottom sheet, the core sheet and the top sheet so that the thermosetting resin transfers into the bottom sheet, the core sheet and the top sheet, the thermosetting resin, when cured, having a resin degradation temperature that is above the melting temperatures of the first and second core molds, (j) heating the panel to cure the thermosetting resin at a temperature below the melting temperatures of the first and second core molds so that the resin of the resin impregnated bottom sheet, core sheet and top sheet hardens and causes the top sheet, core sheet and bottom sheet to become cured and bonded to each other, (k) removing the lower and upper molds to expose a cured panel that includes the cured top, bottom and core sheets with the lower core mold sandwiched between the bottom sheet and the core sheet and the upper core mold sandwiched between the core sheet and the top sheet, (l) heating the cured panel to a temperature that is higher than the melting temperatures of the first and second core molds but lower than the resin degradation temperature to cause the core molds to melt and drain out of the panel to leave a cured panel having a cured bottom sheet, a cured top sheet and a cured central reinforcing core sheet with peak areas that are bonded to the top sheet and valley areas that are bonded to the bottom sheet.

12. The method of claim 11, wherein;

the core mold material contains a filling material that changes the physical properties of the core mold material.

13. The method of claim 11, wherein;

the core mold material contains at least five parts per hundred of ceramic micro-spheres, whereby the micro-spheres reduce the degree by which the core mold material expands or contracts as the temperature of the material is increased and decreased.

14. The method of claim 11, wherein;

the core mold material is foamed so that it includes air pockets within its volume to significantly reduce its density.

15. The method of claim 11, wherein;

at least one of the core molds is foam core that is not melted and removed.

16. The method of claim 11, wherein;

at least one of the core molds include channels that extend between its opposite surfaces at least at some of the peak areas of the core mold so that when resin is transferred into the sheets of the panel, the channels fill with resin thereby forming hardened resin columns that connect and inter-support the top sheet and the bottom sheet of the panel when the resin in the panel is cured.

17. The method of claim 11, wherein;

at least one of the core molds include channels that extend between its opposite surfaces at least at some of the peak areas of the core mold and wherein micro-spheres are introduced into those channels prior to a point when resin is transferred into the sheets of the panel, so that when resin is transferred into the sheets of the panel, the channels fill with resin thereby forming hardened resin columns containing micro-spheres that connect and inter-support the top sheet and the bottom sheet of the panel when the resin in the panel is cured.

18. The method of claim 11, wherein:

at least one of the core molds include channels that extend between its opposite surfaces at least at some of the peak areas of the core mold and wherein reinforcing fibers are introduced into those channels prior to a point when resin is transferred into the sheets of the panel, so that when resin is transferred into the sheets of the panel, the channels fill with resin thereby forming hardened fiber reinforced resin columns that connect and inter-support the top sheet and the bottom sheet of the panel when the resin in the panel is cured.

19. The method of claim 11, wherein;

the resin is a resin that is flexible in its cured condition.

20. The method of claim 11, wherein;

at least one of the top sheet, the core sheet or the bottom sheet is a fibrous cloth material that is pre-impregnated with resin so that it is not necessary to transfer resin into the cloth.

21. The method of claim 11, wherein;

at least one of the core molds include channels that extend between its opposite surfaces at least at some of the peak areas of the core mold and wherein solid reinforcing elements are inserted into the channels to provide reinforcement to resist compressive loads normal the composite panel.

* * * * *